ELECTROLYTIC PROCESS OF PREPARING PURE HYDROGEN

Original Filed March 15, 1967 3 Sheets-Sheet 1 a: NaOH aqua soln.
b: $NH_4Cl$ aqua soln.
c: $NH_4NO_3$ aqua soln.
d: $K_2SO_4$ aqua soln.

a: $0.5M K_2SO_4 + Bi_2Te_3$
b: $0.5M K_2SO_4 + InAs$
c: $0.5M K_2SO_4 + Ge$
d: $0.5M K_2SO_4 + CdTe$
e: $0.5M K_2SO_4 + ZnS$
f: $0.5M K_2SO_4$ a: 1M $NH_4Cl$ + $Bi_2Te_3$
b: 1M $NH_4Cl$ + CdSb
c: 1M $NH_4Cl$ + Ge
d: 1M $NH_4Cl$ + Si
e: 1M $NH_4Cl$ a: 40% $NH_4NO_3$ + $Bi_2Te_3$
b: 40% $NH_4NO_3$ + CoS
c: 40% $NH_4NO_3$ a: NaOH aqua soln. (20°C)
b: NaOH aqua soln. (60°C)
c: $NH_4NO_3$ aqua soln. (10°C)
d: $NH_4NO_3$ aqua soln. (40°C)

United States Patent Office

Re. 28,083
Reissued July 23, 1974

28,083
ELECTROLYTIC PROCESS OF PREPARING PURE HYDROGEN

Mutsuaki Shinagawa, Amagasaki, and Hiroyuki Nezu, Hirakata, Japan, assignors to Matsushita Electric Industrial Co., Ltd., Osaka, Japan Original No. 3,458,412, dated July 29, 1969, Ser. No. 623,426, Mar. 15, 1967. Application for reissue Nov. 1, 1971, Ser. No. 194,762, which is a continuation of abandoned application Ser. No. 51,289, June 30, 1970
Claims priority, application Japan, Mar. 30, 1966, 41/20,482
Int. Cl. C01b *13/04*
U.S. Cl. 204—129 18 Claims

Matter enclosed in heavy brackets [ ] appears in the original patent but forms no part of this reissue specification; matter printed in italics indicates the additions made by reissue.

ABSTRACT OF THE DISCLOSURE

*The preparation of pure hydrogen by electrolyzing water in a cell having a mercury cathode, the water being in an aqueous solution of an electrolyte such as ammonium salts where a semiconductor material having a forbidden band spacing less than 3.6 ev. is suspended. Examples of such semiconductors are $Bi_2Te_3$, Te, InAs, CdSb, Ge, Si, CdTe and Zns.*

[Preparation of pure hydrogen by electrolyzing water in a cell having mercury cathode, the water being an aqueous solution of ammonium salts such as $NH_4Cl$ or $NH_4NO_3$ where a powdered semiconductor material having forbidden band spacing less than 0.5 ev. is suspended. The material is $Bi_2Te_3$, Te, InAs, CdSb, Ge, Si, CdTe or ZnS.]

*This application is a continuation of Reissue Ser. No. 51,289 filed June 30, 1970, now abandoned.*

This invention is concerned with a process of preparing pure hydrogen by electrolysis of water. More particularly, the present invention relates to a process for preparing pure hydrogen by electrolyzing an aqueous solution of [ammonium salts] *an electrolyte* with a mercury cathode, a [powdered] semiconductor material being suspended therein.

In the conventional electrolysis of water for production of hydrogen, caustic alkali is added to improve the electric conductivity of water, iron or nickel which has been properly treated is used as an electrode to prevent over-voltage and corrosion. The conventional method is not satisfactory. Current efficiency is theoretically speaking, 100 percent, because side-reaction does not take place except the generation of hydrogen and oxygen. In practice, the current efficiency was nearly 100 percent in the single electrode-type electrolytic cell and 90–95% in the double electrode-type electrolytic cell. However, the power consumption depends almost on the cell voltage (actual decomposition voltage), because the current efficiency is nearly 100%. The cell voltage is higher than theoretical decomposition voltage by such a value that corresponds to the voltage due to over-voltage and concentration polarization as well as the voltage drop due to the internal resistances based on electrolyte, membrane, and conductor. The cell voltage is practically within the range of 1.9 to 2.6 v. (theoretical voltage for decomposition of water: 1.22 v., at 30° C.).

To generate 1 m.$^3$ of pure hydrogen, 4.5–6.2 kwh. is required. The power consumption will be reduced by controlling the composition of the electrolyte and electing electrode materials. The relation between concentration of sodium hydroxide solution used as an electrolyte and electric conductivity thereof shows that the electric conductivity has a maximum point at 15%. The electric conductivity of a sodium hydroxide solution is remarkably lowered, as carbon dioxide is absorbed. Carbonate formed by the absorption of carbon dioxide has a relatively low solubility, so that the carbonate deposits in the electrolytic cell, to increase internal resistance. Accordingly, make-up water should be controlled to keep the absorption of carbon dioxide gas at a minimum. On the other hand, the size of bubble developed by the electrolysis depends upon the concentration and temperature of the solution. The ascending speed of the bubble depends on the viscosity and specific weight of the solution. Consequently, the requirement for the sodium hydroxide solution as an electrolyte has not yet been fully met, when it is compared with other electrolyte solutions. Thus the sodium hydroxide solution has more room for improvement.

It is an object of this invention to provide an improved electrolytic preparation of pure hydrogen.

It is another object of the present invention to provide a simplified and practical process for the same.

A further object of this invention is to provide a process for producing pure hydrogen in commercial and economical manner.

According to the present *preferred aspect of this* invention, mercury is employed as the cathode and an aqueous solution of ammonium salts as the electrolyte. A small amount of powdered semiconductor materials is further suspended in the aqueous solution.

The preferred ammonium salts are ammonium chloride and ammonium nitrate. *The semiconductor* [Semiconductor] material should have a forbidden band spacing of less than *3.6 ev., preferably less than* 0.5 ev. and containing chemical elements of groups V and VI of the Periodic Table. Examples are bismuth telluride, indium arsenide, cadmium antimonide and tellurium as a catalyser.

Generally speaking, the present invention provides a fundamentally improved combination of the electrode and electrolyte in the electrolytic system. The inventors have carried out various studies of the current-electric potential curve upon suspending semiconductor material into the electrolytic system under constant-potential of constant-voltage. From the result of the above studies it has been proposed to determine the range of the hydrogen over-voltage which is effected by the forbidden band spacing in the semiconductor material to be used.

In the accompanying drawings, FIG. 1 is a diagrammatic view of relations between the concentration and electrolytic conductivity in an aqueous solution of electrolyte such as sodium hydroxide, ammonium chloride, ammonium nitrate and potassium sulfate, respectively.

Figure 2:
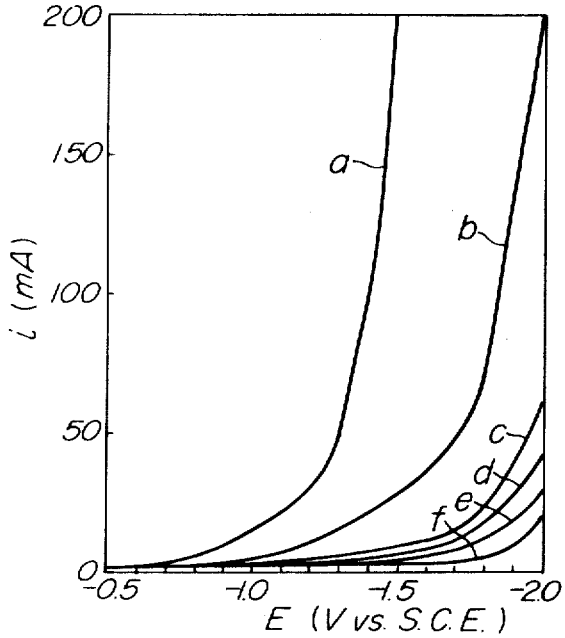
FIG. 2 is a diagram of current-electric potential in an electrolytic system of mercury cathode (electrode surface: 10 cm.$^2$), carbon anode (diameter: 1 cm.) and electrolyte (60 ml.) of an aqueous solution of potassium sulfate (0.5 M), suspending 500 mg. of various kinds of semiconductor materials (particle size of 50–100$\mu$) under constant potential.

It is well known that in electrolysis, the current may be regulated by the voltage applied, and the current will start to flow when the voltage reaches a certain level but not at lower voltages. The voltage at this point is called the "voltage of decomposition." FIG. 2 represents the cathode potentials in the various systems comprising a saturated calomel electrode and the smaller the forbidden band spacing of the semiconductor material, the lower is the voltage of decomposition of water. In the electrolysis of pure water, employing electrochemical catalysts such as semiconductor material may serve conspicuously to decrease the hydrogen over voltage on the cathode and, consequently also decrease both the voltage and the consumption of power of the electrolytic cell.

Figure 3:
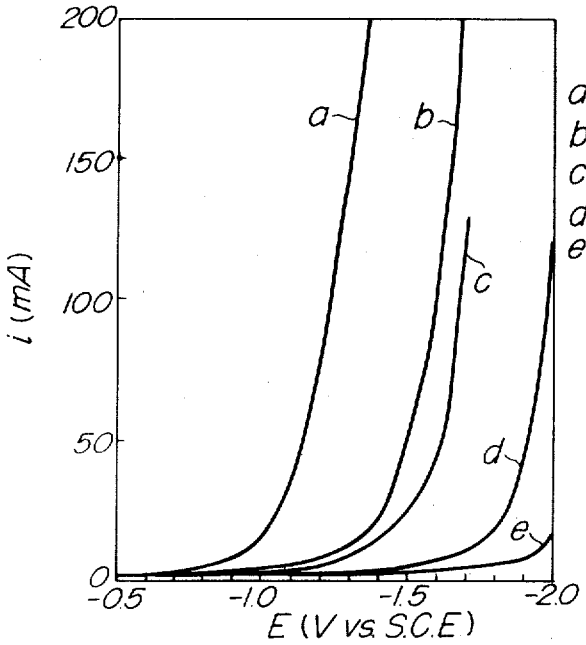
FIG. 3 is a diagram of current-electric potential in an electrolytic system of mercury cathode, carbon anode and an aqueous ammonium chloride solution (1 M), suspending various kinds of semiconductor materials under constant potential.
Figure 4:
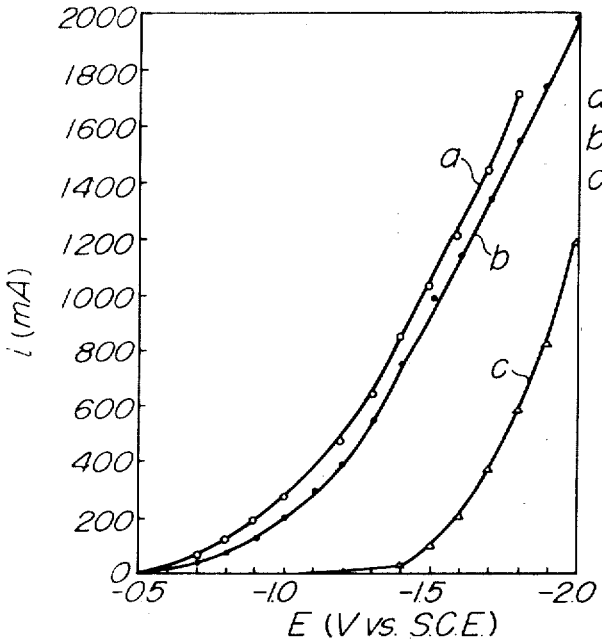
FIG. 4 is a diagram of current-electric potential in an electrolytic system of mercury cathode, nickel anode and a 40% solution of ammonium nitrate (5.9 M), suspending bismuth telluride and cobalt sulfide under constant potential.

FIG. 3 is the cathode potentials in the various system comprising 1 M-ammonium chloride solution as the electrolyte, and shows the same results as shown in FIG. 2. The value of the forbidden band spacing of the semiconductor material used according to FIG. 2 and FIG. 3 is set forth in Table 1.

TABLE 1

| Semiconductor material: | Forbidden band spacing (ev.) |
|---|---|
| $Bi_2Te_3$ | 0.15 |
| Te | 0.3 |
| InAs | 0.39 |
| CdSb | 0.50 |
| Ge | 0.67 |
| Si | 1.11 |
| CdTe | 1.4 |
| ZnS | 3.6 |

Figure 1:
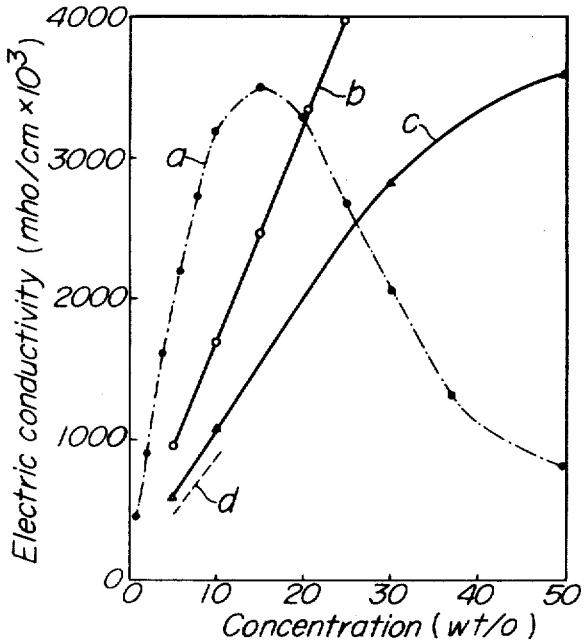

As other examples, the voltage of the electrolytic cell when constant current (400 ma.) electrolyses are carried out with solutions containing 20% sodium hydroxide, 20% ammonium chloride or 40% ammonium nitrate by employing various kinds of the electrode materials are set forth in Table 2. In these cases, the concentrations of electrolytes are selected from the concentrations which give almost the same electric conductivity as shown in FIG. 1.

TABLE 2

| Electrolyte | Electrode | | Semiconductor material added (500 mg.) | Voltage of the electrolytic cell (v.) |
|---|---|---|---|---|
| | Anode | Cathode | | |
| 20% NaOH | Ni | Fe | | 2.7 |
| 20% $NH_4Cl$ | Carbon | Hg | | 3.5 |
| | do | Hg | Te | 2.8 |
| | do | Hg | CoS | 2.6 |
| 40% $NH_4NO_3$ | Ni | Hg | | 3.6 |
| | Ni | Hg | $Bi_2Te_3$ | 2.8 |
| | Ni | Hg | CoS | 2.8 |
| | Carbon | Hg | | 3.9 |
| | do | Hg | CoS | 2.9 |

Figure 5:
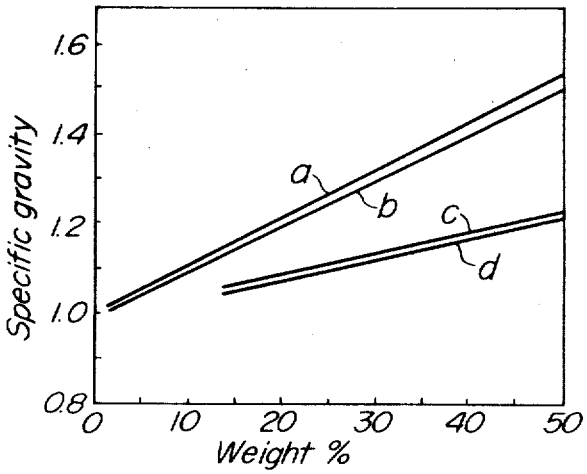
FIG. 5 is a diagram of the relation between concentration (percent by weight) and density in the solution of sodium hydroxide and ammonium nitrate.

As seen in Table 2, when a semiconductor material is added to the cell, the voltage of the electrolytic cell in which ammonium chloride is used as the electrolyte and though mercury cathode, which has a high hydrogen over-voltage is used, employing semiconductor material shows almost the same value as that of system which comprises sodium hydroxide solution and iron cathode without using such a semiconductor material. Furthermore, as seen from FIG. 1 sodium hydroxide solution shows the maximum electric conductivity at the concentration of 15%, but it may be found that each of ammonium chloride and ammonium nitrate can have a higher electric conductivity by selecting properly the concentration thereof than the maximum value of the above sodium hydroxide system. Accordingly, it may be possible to give a lower voltage of the electrolytic cell employing mercury cathode and ammonium chloride or ammonium nitrate system as shown in Table 2. Although the electrolyte system comprising ammonium chloride solution causes evolution of chlorine at the anode, ammonium nitrate give pure oxygen gas evolved at the anode as in the case of sodium hydroxide electrolysis. In the case of ammonium nitrate, there is significantly less chance to absorb carbon dioxide as compared with and differing from that of sodium hydroxide. Ascending rate of the gas bubbles in ammonium nitrate solution is higher than that in sodium hydroxide solution, since ammonium nitrate solution has a lower specific gravity for its given concentration as shown in FIG. 5.

Also regards to viscosity, ammonium nitrate solution has smaller viscosity than sodium hydroxide solution at their respective given concentration, and the bubbles in the ammonium nitrate solution ascend faster than in said sodium hydroxide solution. As mentioned above, in the electrolyte system comprising ammonium salts the hydrogen over-voltage is significantly decreased as compared with the electrolyte system comprising potassium sulfate because of tendency to lowering hydrogen over-voltage of the various semiconductors as shown in FIGS. 2 and 3. Therefore, it is preferable to employ ammonium salts as an electrolyte in the point of lowering the hydrogen over-voltage resulting from reduction of ammonium ion. Furthermore, constant current electrolyses of the ammonium nitrate solution with the suspending semiconductor material are carried out by employing iron, silver and mercury as the cathode material under consideration of hydrogen over-voltage degree thereof, and only the mercury cathode has indicated to be superior in decreasing the voltage. As a result, it has been found that mercury, even if it has a high hydrogen over-voltage, is preferable to employ as the cathode material in view of its corrosion resistance to the electrolyte. It has been found that from the test value shown in FIGS. 2 and 3 and the measured values shown in Table 2, for a process of producing hydrogen by electrolyzing water in which 20% sodium hydroxide is used with nickel anode, addition of semiconductor material having less than 0.5 ev. of the forbidden band spacing as the catalyst to the electrolyte solution is effective.

The present invention is, therefore, characterized in a process of preparing pure hydrogen which comprises electrolyzing an electrolyte in the presence of powdered semiconductor material with suspended form. That is first, an electrolyte solution of ammonium salts is *preferably* used. The solution has a higher electric conductivity, a higher ascending rate of gas bubbles evolved and significantly lower in absorption of carbon dioxide as compared with those of sodium hydroxide. The second is that mercury cathode is used. The mercury cathode is less corrosible against the electrolyte solution than iron cathode, because mercury can easily be recovered and exchanged, and easily stirrable. The powdered semiconductor material having *preferably* less than 0.5 ev. at the forbidden band spacing is suspended in a given electrolyte solution, in order to decrease the hydrogen over-voltage, thereby to lower the consumption of electrical power.

Furthermore, it is possible to prepare pure hydrogen with a superior equipment of high efficiency from the point of chemical engineering taking into account physical constants of the electrolyte such as conductivity, specific gravity, fluidity and processibility of the cathode material.

Example 1

Sixty millilitres of an aqueous solution containing 20% ammonium chloride was introduced into an electrolytic cell having a diaphragm of a porous fused glass plate (thickness: 1 mm.), mercury cathode (surface area: 10 cm.$^2$) and carbon anode (surface area: 10 cm.$^2$). Before electrolysis, 0.5 gram of powdered tellurium (particle size 74–105$\mu$, forbidden band spacing 0.3 ev.) was added to the above electrolyte; the solution was maintained at 30° C. Electrolysis of the thus prepared electrolyte was conducted at 400 ma. constant current. It was noted that the evolving gas increased linearly with electrolysis time. Cell voltage was 2.8 v. at 400 ma. According to gas chromatography with molecular sieve of 5 a. column, the gas evolved was 100% pure hydrogen.

On the other hand, electrolysis was conducted with the same electrolytes, cells and electrodes under constant potential with and without the addition of powdered semiconductor material. With the powdered semiconductor material hydrogen over-voltage was −1.12 v., a lowering of 0.73 v. when compared with the case without such addition, of which hydrogen over-voltage was −1.85 v.

Example 2

Sixty millilitres of an aqueous solution containing 40% ammonium nitrate was added into the electrolytic cell having a diaphragm of a porous fused glass plate (thickness: 1 mm.), mercury cathode (surface area: 10 cm.$^2$) and nickel anode (surface area: 10 cm.$^2$).

Before electrolysis, 0.5 g. of powdered bismuth telluride (particle size: 74–105$\mu$, forbidden band spacing: 0.15 ev.) was added to the above electrolyte; the solution temperature was maintained at 30° C. Electrolysis of the thus prepared electrolyte was conducted under constant potential, which gave a hydrogen over-voltage of 0.8 v. This voltage was 0.60 v. lower than 1.4 v. given by electrolysis without the semiconductor material powder. When electrolysis was conducted with the same electrolyte, cell and electrodes under a constant current of 400 ma., the gas evolving from cathode increased as time elapses, and the graph relation of the amount of gas evolved to time was observed to be linear; the cell voltage was 2.8 v. at electrolysis current 400 ma. According to gas chromatograph with molecular sieve 5 a. column, gas thus evolved was 100% pure hydrogen.

Example 3

Sixty millilitres of an aqueous solution containing either 20% ammonium chloride or 40% ammonium nitrate was introduced into an electrolytic cell having a diaphragm of a porous fused glass plate (thickness: 1 mm.), mercury cathode (surface area: 10 cm.$^2$) and carbon anode (surface area: 10 cm.$^2$). Before electrolysis, 0.5 gram of cobalt [sulphate] *sulfide* (particle size: 5–10$\mu$) was added to the electrolyte which was maintained at 30° C. Electrolysis at 400 ma., constant current, caused gas to evolve from the cathode, of which amount increased linearly with time. In this electrolysis, with 20% ammonium chloride and 0.5 g. of cobalt [sulphate] *sulfide* suspended in the electrolyte, cell voltage was 2.6 v. at electrolysis current of 400 ma. With 40% ammonium nitrate and 0.5 g. of cobalt [sulphate] *sulfide*, the cell voltage was 2.9 v. Gas chromatography with molecular sieve 5 a. revealed that the gas evolved was 100% pure hydrogen.

On the other hand, electrolyses conducted with the same electrolytes, cells and electrodes as above under constant potential, gave the results as shown in Table 3.

TABLE 3

| Electolyte | Semiconductor material | Hydrogen over-voltage vs. saturated calomel electrode | Over-voltage decrease |
|---|---|---|---|
| 20% $NH_4Cl$ | | −1.85 | |
| | CoS | −0.93 | 0.92 |
| 40% $NH_4NO_3$ | | 1.37 | |
| | CoS | 0.58 | 0.79 |

The pure hydrogen produced according to the present invention can be used extensively, since pure hydrogen is required not only for synthesis but in various fields of technology.

We claim:

1. A process for preparing pure hydrogen which comprises electrolyzing water in a cell having a mercury cathode and an aqueous solution of inorganic ammonium salts as an electrolyte, at least one powdered semiconductor having a forbidden band spacing of 0.5 ev. or less being suspended in the solution, said semiconductor comprising elements of groups V and VI of the Periodic Table.

2. A process according to claim 1, wherein the ammonium salt is ammonium chloride.

3. A process according to claim 1, wherein the ammonium salt is ammonium nitrate.

4. A process according to claim 1, wherein the powdered semiconductor material is at least one selected from the group consisting of $Bi_2Te_3$, InAs, *and* CdSb[, Ge, Si, CdTe, and ZnS].

5. A process according to claim 2, wherein about 20% by weight of ammonium chloride is in an aqueous solution.

6. A process according to claim 3, wherein about 40% by weight of ammonium nitrate is in an aqueous solution.

7. A process according to claim 1, wherein the powdered semiconductor is present in a catalytic amount.

*8. A process for preparing pure hydrogen which comprises electrolyzing water in a cell having a mercury cathode and containing a composition consisting essentially of an aqueous solution of an electrolyte and at least one semiconductor having a forbidden band spacing of 3.6 ev. or less suspended in said solution.*

*9. A process according to claim 1, wherein an aqueous solution containing ammonium salt is used as the electrolyte.*

*10. A process according to claim 9 wherein the ammonium salt is ammonium chloride.*

*11. A process according to claim 9, wherein the ammonium salt is ammonium nitrate.*

*12. A process according to claim 10, wherein the electrolyte is an aqueous solution of about 20% by weight of ammonium chloride.*

*13. A process according to claim 11, wherein the electrolyte is an aqueous solution of about 40% by weight of ammonium nitrate.*

*14. A process according to claim 1, wherein the semiconductor material is present as a powder.*

*15. A process according to Claim 1, wherein said semiconductor material is ZnS, CdTe, Si or Ge.*

*16. A process according to claim 1, wherein said semiconductor material has a forbidden band spacing of 0.5 ev. or less.*

*17. A process according to claim 1, wherein said semiconductor material is $Bi_2Te_3$, Te, CoS, InAs or CdSb.*

*18. A process according to claim 1, wherein mercury is employed as the cathode.*

References Cited

The following references, cited by the Examiner, are of record in the patented file of this patent or the original patent.

UNITED STATES PATENTS 2,433,871 1/1948 Porter et al. ---------- 204—129

FOREIGN PATENTS 303,027 10/1929 Great Britain.

JOHN H. MACK, Primary Examiner

R. L. ANDREWS, Assistant Examiner